US007593302B2

(12) United States Patent
Yamamoto et al.

(10) Patent No.: US 7,593,302 B2
(45) Date of Patent: Sep. 22, 2009

(54) RECORDING STRATEGY IN MULTILEVEL RECORDING

(75) Inventors: Masakuni Yamamoto, Yamato (JP); Jun Sumioka, Kawasaki-si (JP); Kaoru Okamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 541 days.

(21) Appl. No.: 11/549,759

(22) Filed: Oct. 16, 2006

(65) Prior Publication Data

US 2007/0091759 A1 Apr. 26, 2007

(30) Foreign Application Priority Data

Oct. 25, 2005 (JP) ............................ 2005-310068

(51) Int. Cl.
*G11B 7/00* (2006.01)

(52) U.S. Cl. .................................................. 369/59.11

(58) Field of Classification Search ............. 369/59.11, 369/59.12, 116, 47.5–47.53
See application file for complete search history.

(56) References Cited

U.S. PATENT DOCUMENTS

| | | | | |
|---|---|---|---|---|
| 5,297,128 | A | 3/1994 | Yamaguchi et al. | |
| 5,365,535 | A | 11/1994 | Yamaguchi et al. | |
| 5,428,594 | A * | 6/1995 | Izumi et al. | 369/116 |
| 5,555,231 | A | 9/1996 | Yamamoto | |
| 7,126,897 | B2 * | 10/2006 | Takeuchi et al. | 369/47.53 |
| 7,474,603 | B2 * | 1/2009 | Maegawa | 369/59.11 |
| 2005/0213465 | A1 * | 9/2005 | Takeuchi | 369/59.11 |
| 2006/0280069 | A1 | 12/2006 | Yamamoto et al. | |
| 2007/0025217 | A1 | 2/2007 | Miyaoka et al. | |
| 2007/0177478 | A1 | 8/2007 | Sumioka et al. | |

FOREIGN PATENT DOCUMENTS

| | | |
|---|---|---|
| JP | 5-128530 | 5/1993 |
| JP | 2002-245626 | 8/2002 |

* cited by examiner

*Primary Examiner*—Thang V Tran
(74) *Attorney, Agent, or Firm*—Fitzpatrick, Cella, Harper & Scinto

(57) ABSTRACT

An optical information recording method includes the steps of irradiating laser light onto cells provided on a track of an optical information recording medium, recording on the optical information recording medium multilevel information including information of a level zero for which no information pit is formed, by changing, for each of the cells, widths in a track direction or sizes of information pits in the cells, and, for recording the information of a level zero, irradiating the laser light at a power that is greater than an erasing power for erasing the information pits and that does not permit formation of the information pits.

15 Claims, 11 Drawing Sheets

Figure 4:
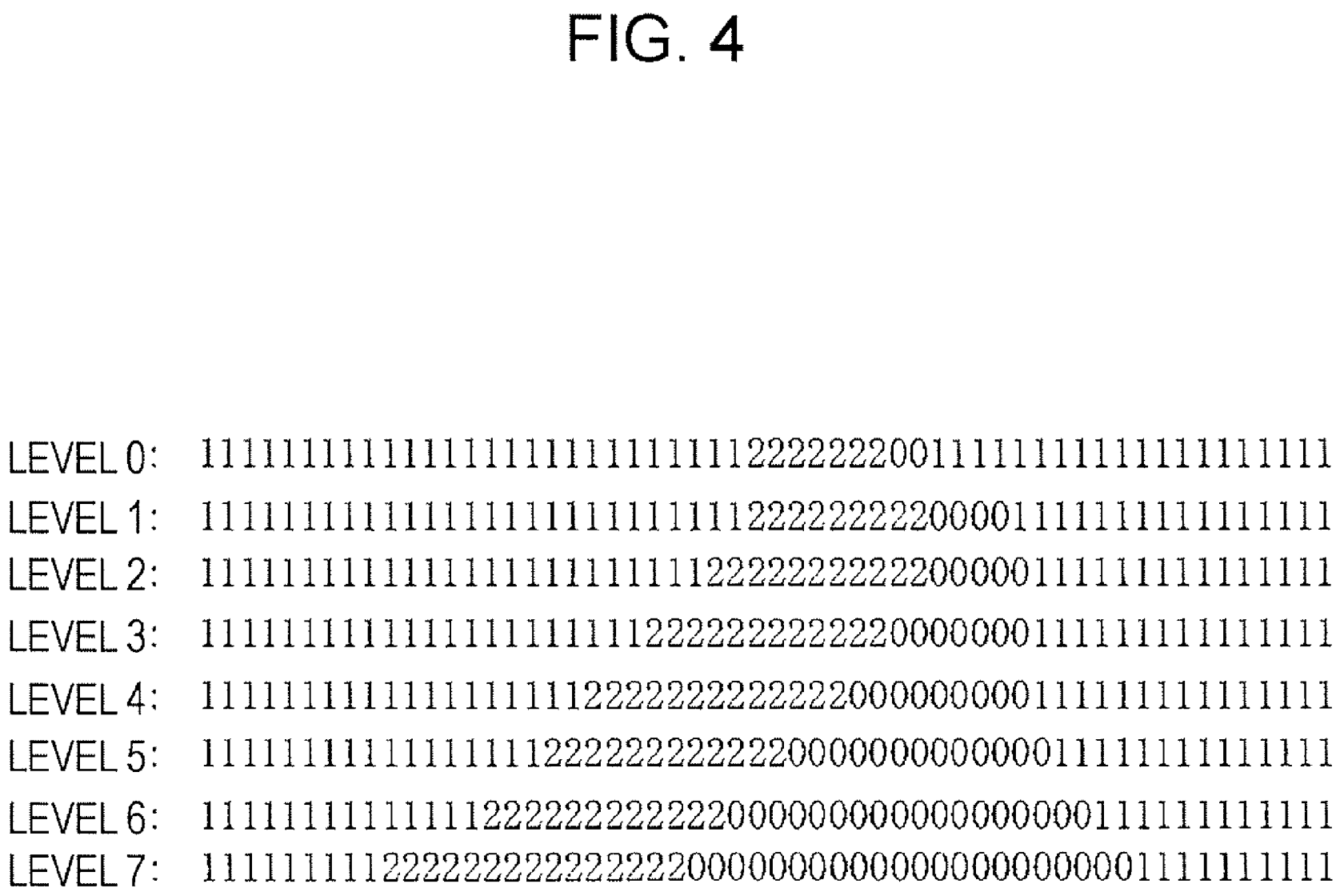

LEVEL 0: 11111111111111111111111111122222220011111111111111111111

LEVEL 1: 11111111111111111111111111122222222200001111111111111111

LEVEL 2: 11111111111111111111111112222222222200000111111111111111

LEVEL 3: 11111111111111111111122222222222220000000111111111111111

LEVEL 4: 11111111111111111112222222222222000000000111111111111111

LEVEL 5: 11111111111111111222222222222000000000000011111111111111

LEVEL 6: 11111111111111222222222222000000000000000000111111111111

LEVEL 7: 11111111122222222222222200000000000000000000001111111111

FIG. 5

```
LEVEL 0: 11111111111111111111111111111111111111111111111111111111
LEVEL 1: 11111111111111111111111111122222222200001111111111111111
LEVEL 2: 11111111111111111111111112222222222200000111111111111111
LEVEL 3: 11111111111111111111112222222222220000000111111111111111
LEVEL 4: 11111111111111111112222222222222000000000111111111111111
LEVEL 5: 11111111111111111222222222222000000000000011111111111111
LEVEL 6: 11111111111111222222222220000000000000000000111111111111
LEVEL 7: 11111111122222222222222200000000000000000000001111111111
```

RECORDING STRATEGY IN MULTILEVEL RECORDING

BACKGROUND OF THE INVENTION

1. Field of the Invention

The present invention relates to optical information recording/reproduction apparatuses and methods, in which recording or reproduction is performed using three or more levels of information pits or marks. In particular, the present invention relates to an optical information recording/reproduction apparatus and method which allow averaging of heat interference in recording so as to reduce the effect thereof.

2. Description of the Related Art

Research and development have been promoted with a view to increase recording density. For example, techniques have been developed for increasing the efficiency in multilevel recording/reproduction without changing the size of a light spot.

For example, the present inventor proposes a multilevel recording/reproduction technique in Japanese Patent Application Laid-Open No. 5-128530. In this technique, multilevel information is recorded on an information track of an optical information recording medium, using a combination of the length of an information pit in the track direction and the amount of shift of the information pit in the track direction with respect to a reproduction light spot. Japanese Patent Application Laid-Open No. 5-128530 also describes a reproduction method for reproducing the recorded multilevel information pit using correlation between a detection signal which has been learned and a detection signal which is obtained from the light spot.

In addition, in "ISOM 2003, Write-once Disks for Multilevel Optical Recording, Draft Collection, Fr-Po-04", published by ISOM, which is an international symposium in the field of optical disc research, an experiment report is presented.

In this report, eight-level recording/reproduction is performed, using an optical system with a violet light source of a 405 nm wavelength and an NA of 0.65, on an optical disc with a track pitch of 0.46 μm provided with a virtual region for recording one information pit (hereinafter referred to as a cell), whose width in the track direction is set to be 0.26 μm.

Setting of the eight-level information pits is performed, for example, by dividing the length of a cell in the track direction shown in FIG. 10 into sixteen (16-channel bits) and setting the level of an information pit as follows: level 0: no information pit to be recorded; level 1: having a width of 2 channel bits; level 2: having a width of 4 channel bits; level 3: having a width of 6 channel bits; level 4: having a width of 8 channel bits; level 5: having a width of 10 channel bits; level 6: having a width of 12 channel bits; and level 7: having a width of 14 channel bits.

Japanese Patent Application Laid-Open No. 2002-245626 describes another multilevel recording/reproduction technique. FIG. 11A is a schematic diagram illustrating a case where information pits 15 are randomly recorded on a track 14 provided on the optical disc. This figure also illustrates a relationship between the information pits 15 recorded on the track 14 and a light spot 16. For example, when a phase change material is used as an erasable recording material in this technique, the light spot 16 is irradiated onto the optical disc, and the light intensity and timing of each of a recording pulse, an erasing pulse, and a cooling pulse are adjusted. This causes the shape of the information pits 15 to be changed, resulting in the formation of information pits with a plurality of levels. In FIG. 11A, for convenience, these information pits 15 are shown as rectangular information pits.

FIG. 11B illustrates a drive waveform of a semiconductor laser, i.e., a recording strategy, which is associated with the recording of the information illustrated in FIG. 11A. In the figure, "Pw" denotes a recording power, "Pe" denotes an erasing power, and "Pc" denotes a cooling power. In this strategy, as shown in FIG. 11B, while the pulse width of the recording power Pw is set constant, the pulse width of the cooling power Pc is changed in accordance with the sizes of the information pits to be recorded.

There are other recording strategies, for example, in which the pulse width of the recording power is relatively changed, or the level of each of the powers is changed. In any of these strategies, no recording power is irradiated for information having a level (level 0 in FIG. 11A) for which no information pit is recorded, as shown in FIGS. 11A and 11B.

When information is reproduced, recorded information pits are scanned using a light spot, and reflected light from the information pits is received by a photodetector. Then, sampling is performed at a timing when the center of the light spot is irradiated on the center of a cell with respect to the track direction. This results in a distribution of amplitudes of a reproduction signal which correspond to the individual levels, as shown in FIG. 12.

As a standardized configuration, the amplitude level of a reproduction signal obtained when there are consecutive information pits of level 0, i.e., there are no written information pits, is set as "1", and the amplitude level of a reproduction signal obtained when information pits of level 7 are consecutively recorded is set as "0".

The value of a reproduction signal (amplitude) level corresponding to each of the information pit levels has a range, since a target information pit is affected by information pits written in the preceding and succeeding cells (inter-symbol interference). As shown in FIG. 12, when the amplitude distribution of a reproduction signal at a certain level is overlapped with that of the reproduction signal at an adjacent level, a fixed threshold value cannot be used for discriminative detection of signal levels.

In general, the effect of such inter-symbol interference is canceled by performing processing on the reproduction signal, such as waveform equalization using a coefficient obtained from the transfer function of an optical system. This separates amplitude distributions corresponding to information pit levels, allowing detection of signal levels using a predetermined threshold value.

When further higher recording density, for example, more than 30 Gbit/inch$^2$, is attempted using an optical system with a violet light source of 405 nm wavelength and an NA of 0.85, the width of a cell may have to be 200 nm or less when eight-level information pits are applied.

In addition to the inter-symbol interference, information pits in adjacent cells can be affected by heat created during recording, i.e., heat interference. Through this heat interference, the size of an information pit is increased or decreased in accordance with the sizes of information pits written in the preceding and succeeding cells. The possibility that the heat interference occurs increases with a decreasing cell width. In addition, the heat interference causes the center position of the information pit to be deviated forward or backward in the track direction in accordance with the sizes of the information pits written in the preceding and succeeding cells, resulting in an error in the reproduction signal.

The heat interference is caused by a difference between information pits in terms of the magnitude of power or irradiation time of the light irradiated in recording of the information pits. Thus, a heat difference is maximized between information of level 7 for which the largest information pit is recorded, and the information of level 0, for which no information pit is recorded. Particularly, in the known technique described with reference to FIG. 11B, the information of the level 0, for which no light is irradiated at the recording power, advantageously brings about a significant temperature difference compared with the other levels.

SUMMARY OF THE INVENTION

The present invention has been made in view of the above circumstance. Accordingly, there is a need for a technique for reducing heat interference which occurs between adjacent cells so as to reduce error in the reproduction signal.

Thus, an optical information recording method according to an aspect of the present invention includes the steps of irradiating laser light onto cells provided on a track of an optical information recording medium, recording on the optical information recording medium n-level multilevel information including information of level 0 for which no information pit is formed, by changing, for each of the cells, widths in a track direction or sizes of information pits in the cells, and, for recording the information of level 0, irradiating the laser light at a power that is greater than an erasing power for erasing the information pits and that does not permit formation of the information pits.

In another aspect of the present invention, an optical information recording/reproduction apparatus includes a light source, an information recording circuit, and an information reproduction circuit. The light source irradiates laser light onto virtual cells provided at regular intervals on a track on an optical information recording medium. The information recording circuit records on the optical information recording medium n-level multilevel information including information of a level zero by changing the width in a track direction or sizes of information pits in the virtual cells. The information reproduction circuit reproduces the recorded multilevel information. When the information of a level zero is recorded, the information recording circuit irradiates the laser light at a power that is greater than an erasing power for erasing the information pits and that does not permit formation of the information pits.

In yet another aspect of the present invention, an optical information recording/reproduction apparatus includes light source means, information recording means, and information reproduction means. The light source means irradiates laser light onto virtual cells provided at regular intervals on a track on an optical information recording medium. The information recording means records on the optical information recording medium n-level multilevel information including information of level 0 by changing width in a track direction or sizes of information pits in the virtual cells. The information reproduction means reproduces the recorded multilevel information. When the information of level 0 is recorded, the information recording means irradiates the laser light at a power that is greater than an erasing power for erasing the information pits and that does not permit formation of the information pits.

Further features of the present invention will become apparent from the following description of exemplary embodiments with reference to the attached drawings.

BRIEF DESCRIPTION OF THE DRAWINGS

FIG. 4 illustrates an example of a recording strategy according to an exemplary embodiment of the present invention.

FIG. 5 illustrates a known recording strategy shown for comparison with a recording strategy according to an exemplary embodiment of the present invention.

DETAILED DESCRIPTION OF THE PREFERRED EMBODIMENTS

In the following, the preferred embodiments of the present invention will be described in detail with reference to the accompanying drawings.

Figure 1:
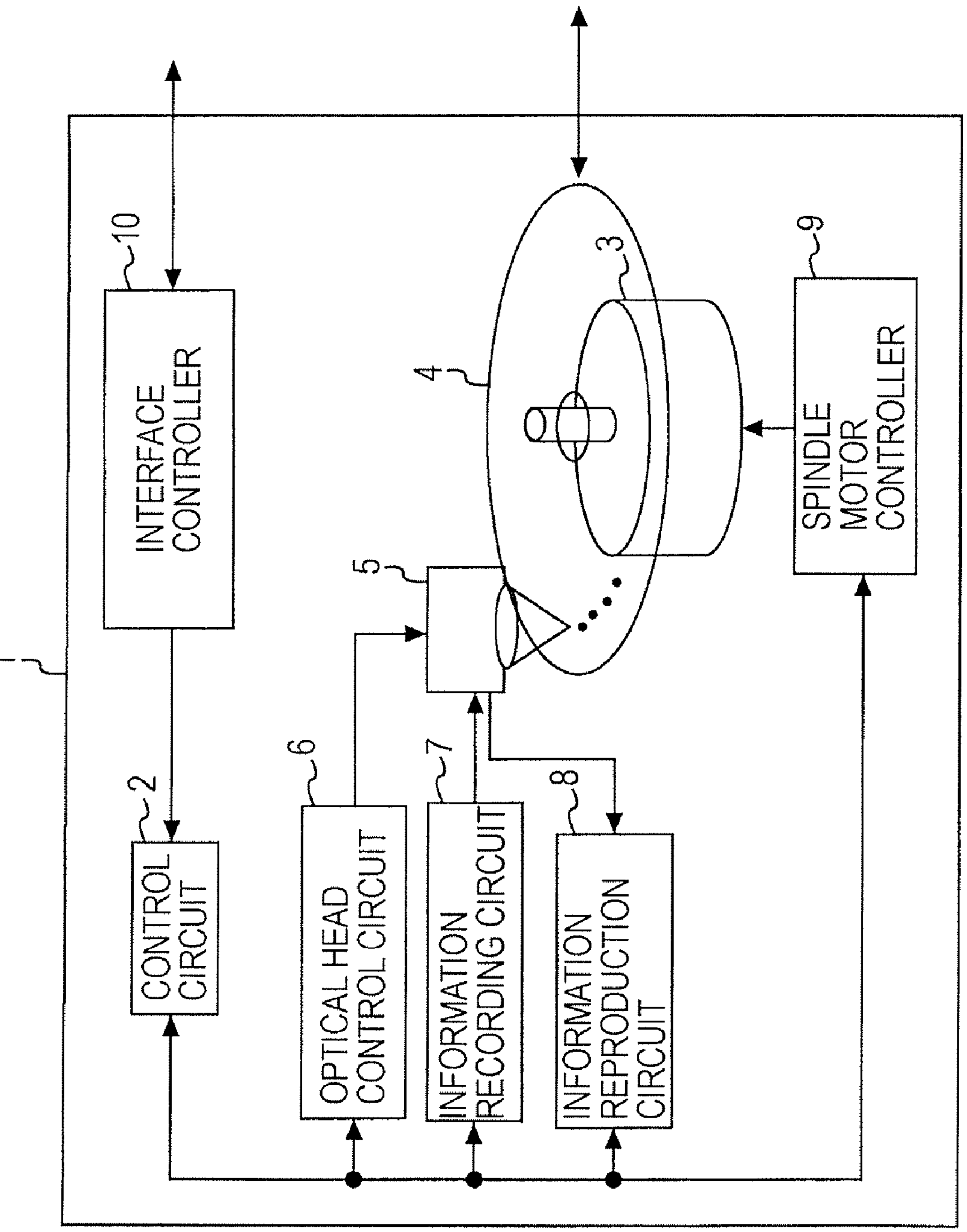
FIG. 1 is a block diagram illustrating an optical information recording/reproduction apparatus according to an exemplary embodiment of the present invention.

FIG. 1 is a block diagram illustrating a configuration of an optical information recording/reproduction apparatus according to an exemplary embodiment of the present invention.

An optical information recording/reproduction apparatus 1 has a control circuit 2, a spindle motor 3, an optical disc 4, an optical head 5, an optical head control circuit 6, an information recording circuit 7, an information reproduction circuit 8, a spindle motor controller 9, and an interface controller 10.

The control circuit 2 controls sending/receiving of information to and from an information processing device such as an external computer and controls recording or reproduction of information on the optical disc 4 using the information recording circuit 7 and the information reproduction circuit 8. The control circuit 2 also controls other operation units. The information recording circuit 7 performs recording of information pits in accordance with a recording strategy based on multilevel information, which will be described below. The information reproduction circuit 8 performs reproduction of multilevel information.

The spindle motor 3 is controlled by the spindle motor controller 9 and drives rotation of the optical disc 4. The optical disc 4 is an optical information recording medium which is inserted into or ejected from the optical information recording/reproduction apparatus 1 by means of a mechanism that is not shown in the figure.

The optical head 5 serves to optically record information on and reproduce information from the optical disc 4. In the optical head 5, for example, when a light source with a wavelength of 405 nm and an objective lens with an NA of 0.85 are provided, a light spot of 0.405 μm is obtained. The size of the track pitch of the optical disc 4 is 0.32 μm in this example. The optical head control circuit 6 serves to control a position of a light spot using the optical head 5 and performs automatic tracking control, seek operation control, and automatic focusing control.

Figure 10:
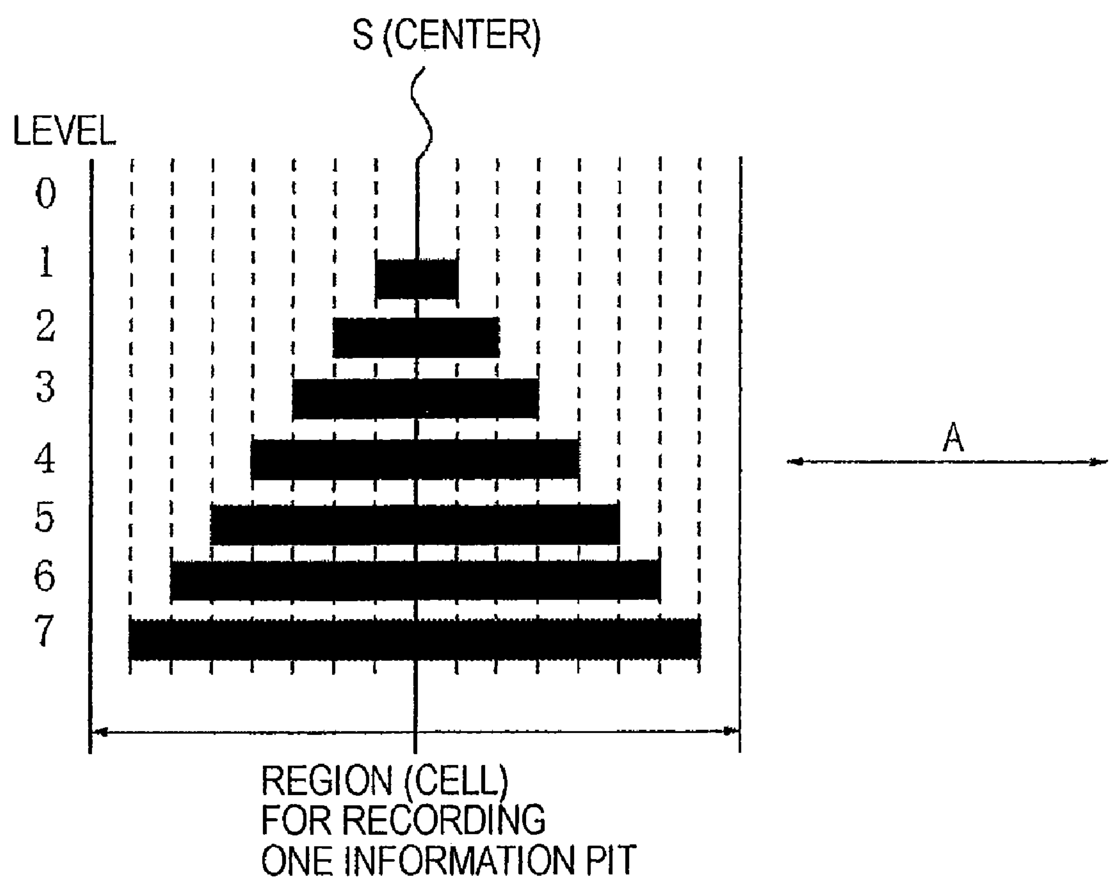
FIG. 10 illustrates widths in a track direction of information pits that vary with the levels of multilevel information pits.
Figures 11A, 11B:
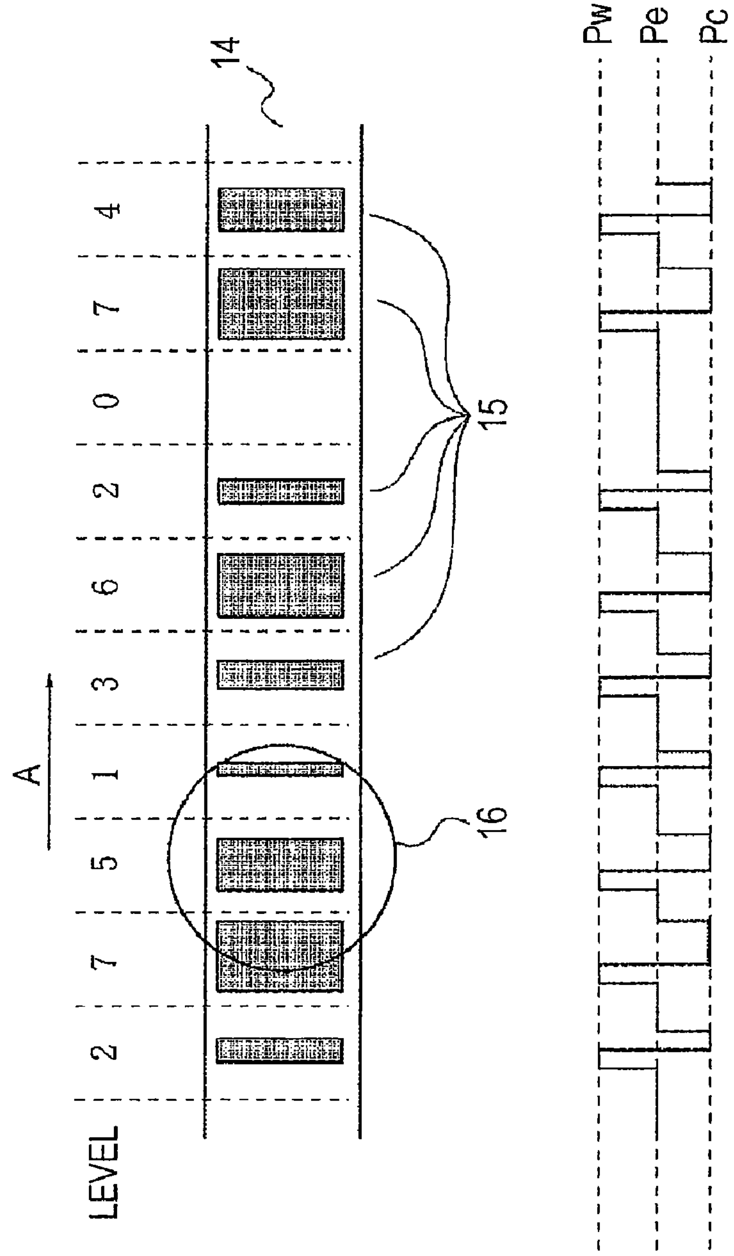
FIGS. 11A and 11B are schematic diagrams illustrating a known recording strategy and recording of multilevel information pits performed using the strategy.
Figure 12:
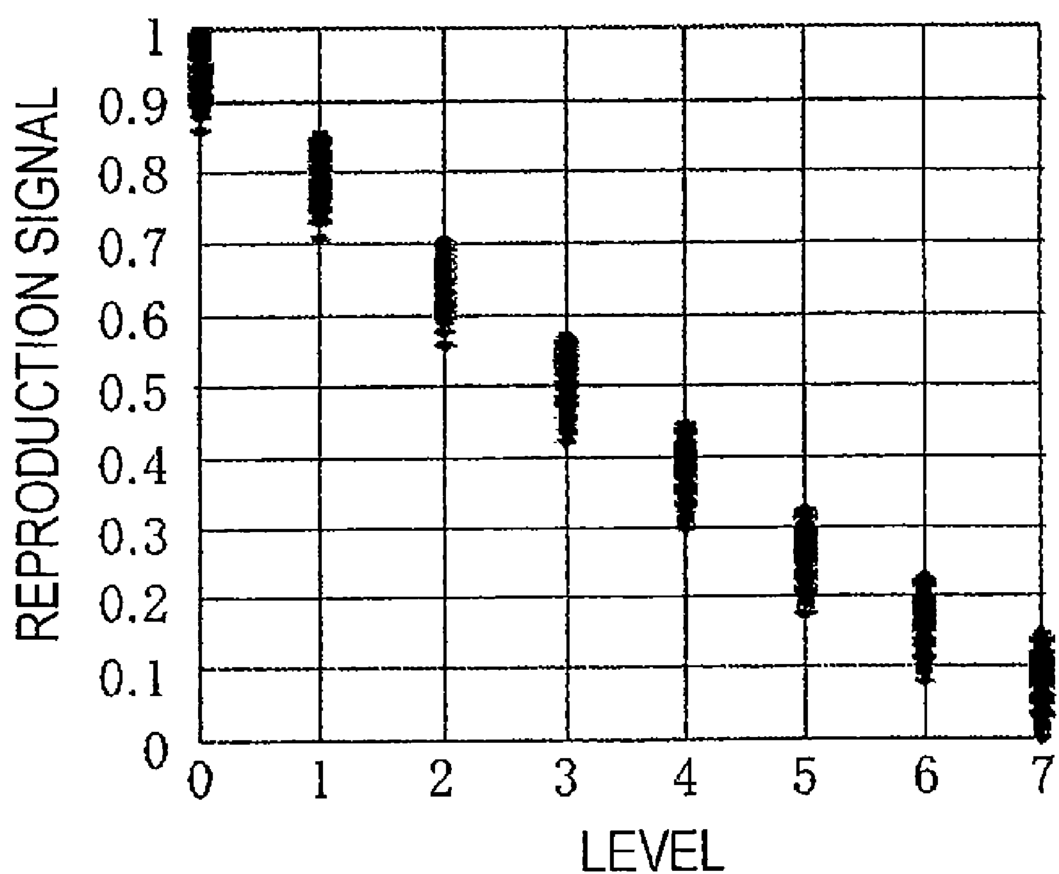
FIG. 12 illustrates an amplitude distribution of signal levels at the center of a cell according to a known technique.

When information pits employed in the optical information recording/reproduction apparatus 1 are recorded, the widths in the track direction (shown as a direction A in FIG. 10) of the information pits are changed in accordance with the levels of the information pits, as illustrated in FIG. 10.

In this exemplary embodiment, since the size of a light spot is approximately 0.405 μm, and the track pitch of the optical disc 4 is 0.32 μm, when the width of the cell is set to 0.2 μm, an area density of 30 $Gbit/inch^2$ can be achieved. The description will be continued on the basis of this cell width of 0.2 μm.

In this case, the width of the smallest information pit (level 1) is 25 nm, and the sizes of the other information pits are as follows: 50 nm (level 2), 75 nm (level 3), 100 nm (level 4), 125 nm (level 5), 150 nm (level 6), and 175 nm (level 7). The level 0is indicative of no information pit for recording.

In the multilevel recording in this exemplary embodiment, eight-level recording is employed. Thus, three bits can be recorded in one cell. For example, in 3-bit information, 0, 0, 0 corresponds to level 0; 0, 0 ,1 corresponds to level 1; 0, 1, 0 corresponds to level 2; 0, 1, 1 corresponds to level 3; 1, 0, 0 corresponds to level 4; 1, 0, 1 corresponds to level 5; 1, 1, 0 corresponds to level 6; and 1, 1, 1 corresponds to level 7. Obviously, other correspondence schemes can be employed.

Figures 2A, 2B:
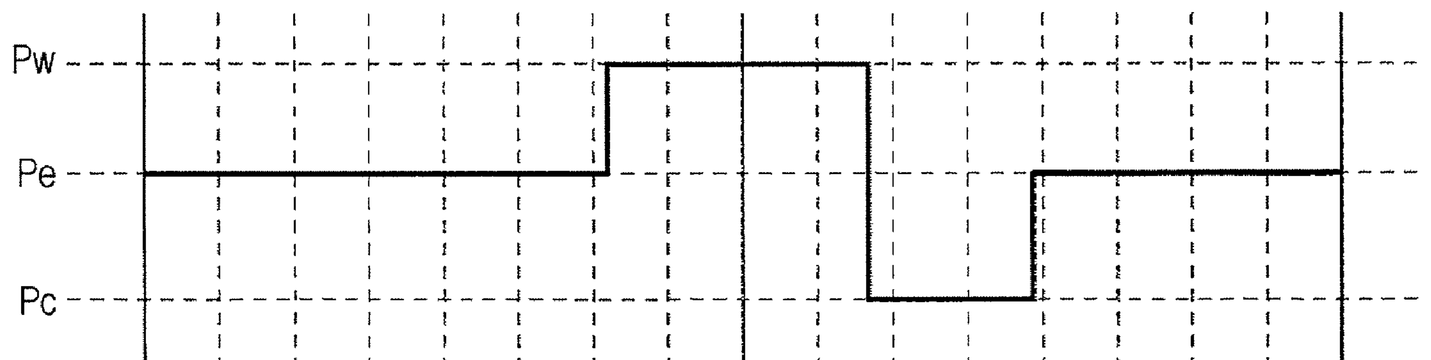
FIGS. 2A and 2B illustrate a recording strategy when information pits according to an exemplary embodiment of the present invention are recorded.

The description of the present exemplary embodiment will be continued on the basis of such multilevel recording that employs a phase-change medium as the optical disc 4. FIGS. 2A and 2B illustrate recording of an information pit using a semiconductor laser. FIG. 2A illustrates the magnitudes (levels) of the power of the laser irradiated onto a cell of 200 nm which is divided into 56 cells. The numbers shown in the figure represent the laser power levels which correspond to the divided cells. Specifically, "1" represents an erasing pulse, "2" represents a recording pulse, and "0" represents a cooling pulse. FIG. 2B illustrates a drive waveform supplied to the semiconductor laser in accordance with the levels shown in FIG. 2A. In the figure, "Pw" represents the recording power, "Pe" represents the erasing power, and "Pc" represents the cooling power.

Figure 3C:
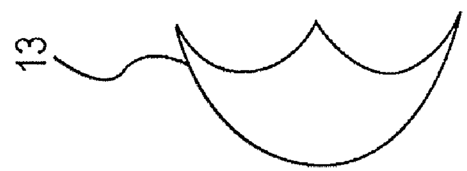
FIGS. 3A to 3C illustrate formation of information pits according to an exemplary embodiment of the present invention on a medium.
Figure 3B:
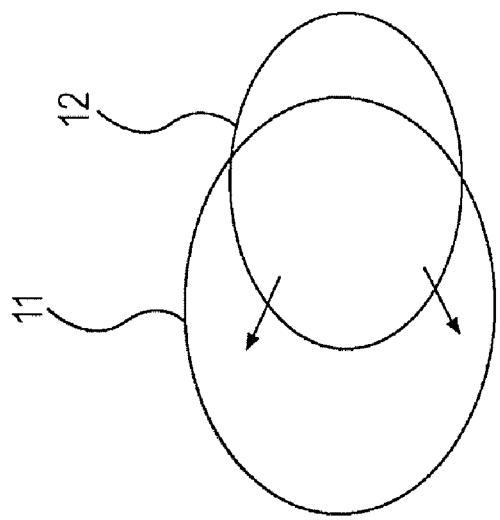
Figure 3A:
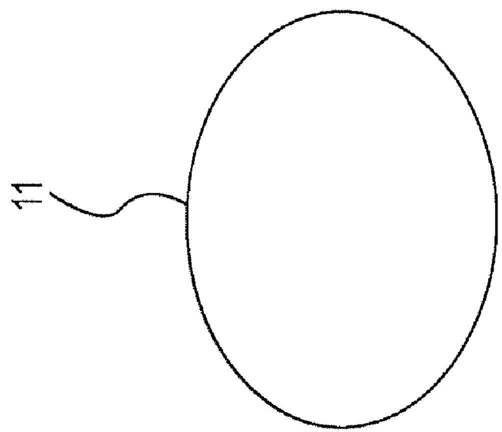

The description of the information pit recording will be continued using a case where a three-value recording strategy is employed. FIGS. 3A to 3C illustrate formation of an information pit which is based on the strategy described with reference to FIGS. 2A and 2B. When a recording pulse is irradiated for a predetermined time period, the temperature of an oval-shaped portion 11 shown in FIG. 3A rises with irradiation time, which leads to melting of the phase-change material.

The states of a phase-change material include an amorphous state (phase) and a crystal state (phase). The phase change material can transform into the amorphous state or the crystal state in accordance with a process in which the temperature of the material decreases from the melting point thereof. Specifically, the phase-change material enters the amorphous state when quenched, or rapidly cooled, and the crystal state when annealed, or slowly cooled. The reflectivity of the phase-change material depends on these states. Thus, by irradiating a light spot for scanning, the difference between these states can be detected as variation in light intensity.

A quenching process begins by irradiating the cooling pulse after the recording pulse. An annealing process is performed by irradiating the erasing pulse after the recording pulse.

When the cooling pulse is irradiated onto the portion 11 for a sufficient period of time, an information pit having such an oval shape as depicted by the portion 11 in FIG. 3A is obtained. However, with such a large information pit, an increase in recording density cannot be achieved. Thus, in this exemplary embodiment, the erasing pulse is irradiated at an early stage onto a portion of the information pit which is being formed so that the portion is annealed for crystallization.

As shown FIG. 3B, a portion 12 in which the temperature is rising due to the irradiation of the erasing pulse is overlapped with the portion 11 in which the temperature is rising due to the irradiation of the recording pulse, in accordance with the length of the cooling pulse shown in FIG. 2B. Due to heat interference which occurs between these two portions, a quenching process which has been in progress is changed to an annealing process around the overlapping edge portion shown in FIG. 3B. As a result, a sagittate portion 13 remains, as shown in FIG. 3C. This sagittate amorphous portion 13 becomes an information pit. With this technique, an information pit which is smaller than the light spot can be recorded with precision.

Thus, it can be assumed that when the irradiation time of the cooling pulse is further reduced, no portion undergoes the quenching process even after irradiation is performed at the recording power, resulting in the recording of no information pit.

Referring now to FIG. 4, a recording strategy for the eight-level (level 0 to level 7) recording according to an exemplary embodiment of the present invention is illustrated. In the figure, "1" represents the erasing power, "2" represents the recording power, and "0" represents the cooling power. This recording strategy is different from a known recording strategy in that the recording pulse is irradiated for information of level 0having no information pit to be recorded. Thus, the recording pulse is irradiated for every cell. This indicates that the effect of heat interference between cells is averaged for each combination of cells regardless of the presence of a cell containing the information of level 0. That is, heat interference equally occurs in each combination of cells.

FIG. 5 illustrates a known recording strategy in which no recording power is irradiated for information of level 0. Using the recording strategy described above and this known recording technique, a recording/reproduction simulation was performed so that the levels of the heat interference can be compared.

Recording parameters used in the simulation were as follows: recording linear velocity, 4.9 m/s; recording power, 5.34 mW; erasing power, 3.6 mW; and cooling power, 0.1 mW. A phase-change optical disc was used.

Figure 6:
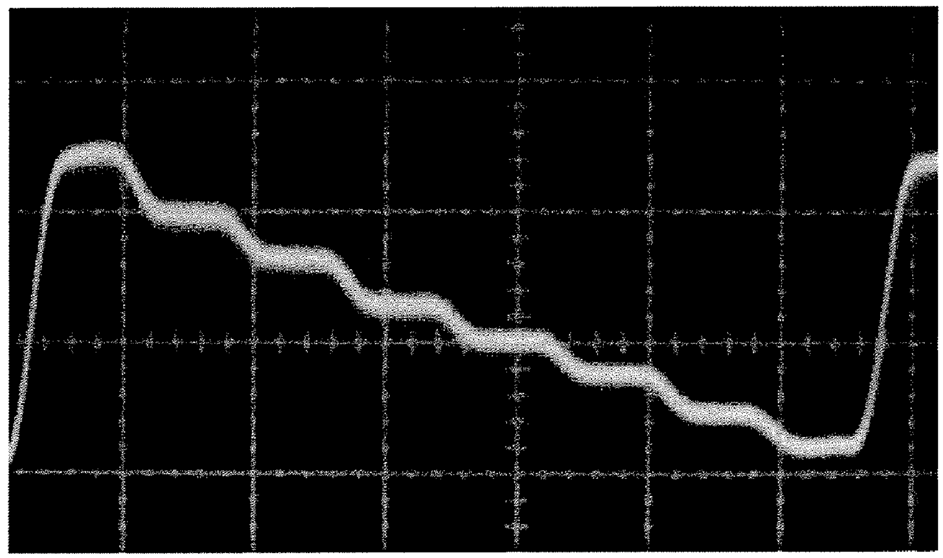
FIG. 6 illustrates a reproduction waveform obtained by reproducing information pits of individual levels recorded in the order of the levels using a known recording strategy.
Figure 7:
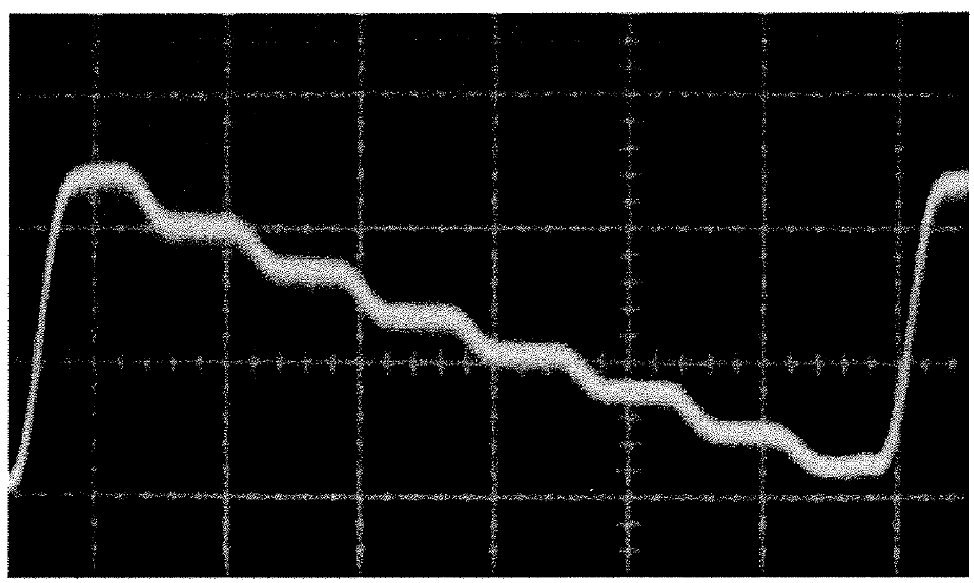
FIG. 7 illustrates a reproduction waveform obtained by reproducing information pits of individual levels recorded in the order of the levels using a recording strategy according to an exemplary embodiment of the present invention.

FIGS. 6 and 7 show the results of recording in which each of the level 0 information to the level 7information was recorded on four consecutive cells. FIG. 6 shows the result obtained when the known recording strategy shown in FIG. 5 was used. FIG. 7 shows the result obtained when the recording strategy according to the exemplary embodiment shown in FIG. 4 was used. The results shown in FIG. 6 and FIG. 7 are essentially the same, and it can be seen that no information pit was recorded even though the recording pulse was irradiated. This indicates that there is no difference in the reproduction amplitude obtained from the level 0 information regardless of the irradiation of the recording pulse.

Next, a recording/reproduction simulation is performed for examining the heat interference.

Figure 8A:
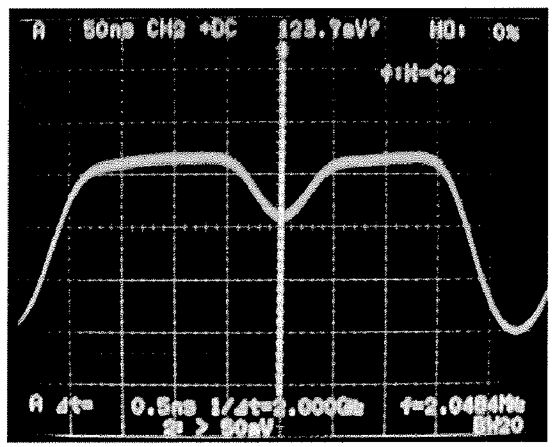
FIGS. 8A to 8C illustrate reproduction waveforms illustrating heat interference which occurs when a known recording strategy is used.
Figure 8B:
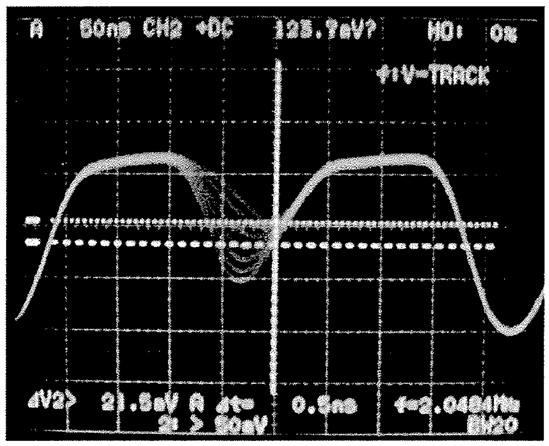
Figure 8C:
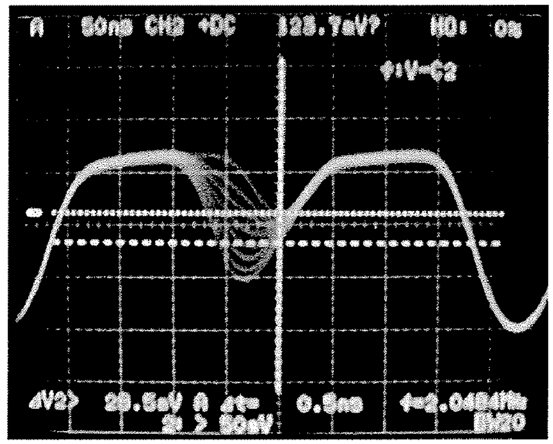

FIGS. 8A to 8C show the results of the simulation when the known recording strategy of FIG. 5 was employed. FIG. 8A illustrates a reproduction signal observed by an oscilloscope. The reproduction signal was obtained by reproducing an information string recorded after a trigger mark. The levels of the individual information in the information string are (0, 0, 0, 0, 0, 3, 0, 0, 0, 0). Specifically, an isolated information pit of level 3 was recorded, and the peak position of the reproduction signal (indicated by a dotted line in the figure) corresponds to the center position of the cell in which the information pit of level 3 was recorded.

FIG. 8B shows an oscilloscope display illustrating reproduction signals obtained by reproducing seven different information strings and the amplitudes of the reproduction signals were superimposed on the oscilloscope display. The information levels of the individual information strings are as follows: (0, 0, 0, 0, 1, 3, 0, 0, 0, 0); (0, 0, 0, 0, 2, 3, 0, 0, 0, 0); (0, 0, 0, 0, 3, 3, 0, 0, 0, 0); (0, 0, 0, 0, 4, 3, 0, 0, 0, 0); (0, 0, 0, 0, 5, 3, 0, 0, 0, 0); (0, 0, 0, 0, 6, 3, 0, 0, 0, 0); (0, 0, 0, 0, 7, 3, 0, 0, 0, 0).

When all of the above seven information strings are recorded, the detected amplitudes of the reproduction signals vary within a range at the cell center position of 21.5 mV on the oscilloscope scale. This variation is caused by both intersymbol interference and heat interference.

FIG. 8C is an oscilloscope display obtained when the reproduction signal corresponding to the information string (0, 0, 0, 0, 0, 3, 0, 0, 0, 0) was added to the above seven reproduction signals. As a result, the range of the variation in the detected reproduction amplitude at the cell center position was increased to 28.5 mV on the oscilloscope scale. This indicates that the single information string containing a (0, 3) combination (i.e., the information string (0, 0, 0, 0, 0, 3, 0, 0, 0, 0)) increases the range of variation in detected reproduction amplitude by as much as 7 mV at the cell center position.

Figure 9A:
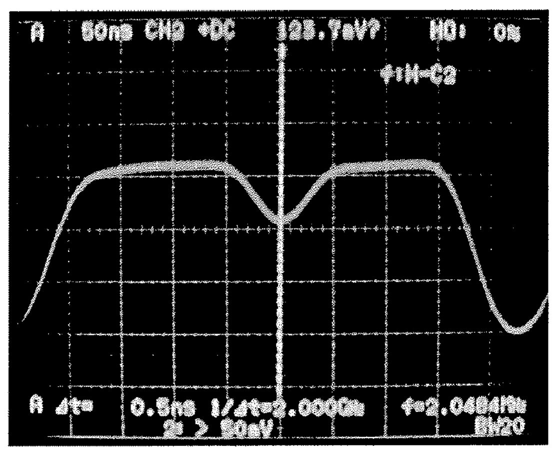
FIGS. 9A to 9C illustrate reproduction waveforms illustrating heat interference which occurs when a recording strategy according to an exemplary embodiment of the present invention is used.
Figure 9B:
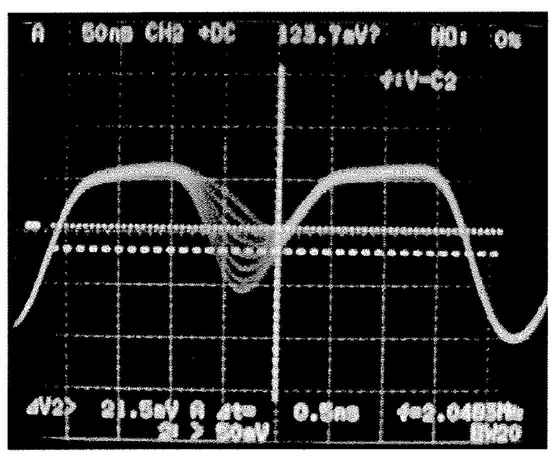
Figure 9C:
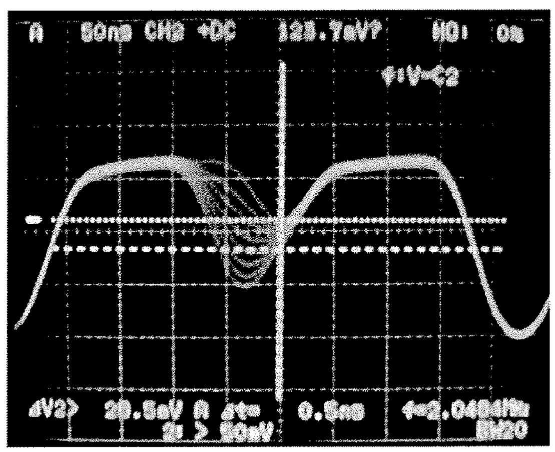

FIGS. 9A to 9C show the results of the simulation when the recording strategy of FIG. 4 according to an exemplary embodiment of the present invention was employed. FIG. 9A shows a reproduction signal observed by an oscilloscope which was obtained by reproducing an information string (0, 0, 0, 0, 0, 3, 0, 0, 0, 0) recorded after a trigger mark.

FIG. 9B is an oscilloscope display illustrating reproduction signals obtained by reproducing seven different information strings and the amplitudes of the reproduction signals are superimposed on the oscilloscope display. The information levels of the individual information strings are as follows: (0, 0, 0, 0, 1, 3, 0, 0, 0, 0); (0, 0, 0, 0, 2, 3, 0, 0, 0, 0); (0, 0, 0, 0, 3, 3, 0, 0, 0, 0); (0, 0, 0, 0, 4, 3, 0, 0, 0, 0); (0, 0, 0, 0, 5, 3, 0, 0, 0, 0); (0, 0, 0, 0, 6, 3, 0, 0, 0, 0); (0, 0, 0, 0, 7, 3, 0, 0, 0, 0).

When all of the above seven information strings are recorded, the detected amplitudes of the reproduction signals vary within a range of 21.5 mV at the cell center position on the oscilloscope scale. This variation is caused by both intersymbol interference and heat interference, and the level of influence of these interferences on the range of variation is similar to that found in the case of the known recording strategy.

FIG. 9C is an oscilloscope display obtained when the reproduction signal corresponding to the information string (0, 0, 0, 0, 0, 3, 0, 0, 0, 0) was added to the above seven reproduction signals. As a result, the range of variation in detected reproduction amplitude at the cell center position was 22.5 mV on the oscilloscope scale. This indicates that an increase in the range of variation caused by the single information string containing a (0, 3) combination was 1 mV. Thus, the range of variation in the reproduction amplitude was reduced, as compared with the case shown in FIGS. 8A to 8C, in which the known recording strategy was employed.

As described in the foregoing, the recording pulse is irradiated in such a manner that an information pit is not formed, even when information of level 0 (i.e., the width or size of an information pit is 0) is recorded. With this arrangement, all cells receive a similar level of interference obtained by averaging all the levels of interference corresponding to the information levels, and thus the quality of reproduction can be enhanced. In the recording of the information of level 0, a pulse having a greater power than the erasing pulse and that does not allow formation of information pits can be irradiated.

In the example of FIG. 4 illustrating the recording strategy described above, the width of the recording pulse is represented by the number of 2s, and the width of the cooling pulse is represented by the number of 0s. In the strategy, as shown in the figure, in the recording of the information of level 0, the number of 2s is seven and the number of 0s is two. However, these numbers are not limited to being seven and two, and any pulse widths can be applied as long as an information pit is not formed during the recording of the information of level 0. In addition, even when the number of 0s is 0, a similar result can be obtained.

In addition, the energy of the laser light irradiated when information of level 0 is recorded does not need to be equal to the energy of the recording power. Specifically, the effect of heat interference can be reduced as long as the laser light has a power that is greater than the erasing power and does not permit formation of an information pit.

Thus, according to an aspect of the present invention, laser light is irradiated even when information having no information pit is recorded in recording of multilevel information. With this arrangement, a difference between the information having no information pit and information having an information pit in terms of heat during recording can be reduced, and the level of heat interference which occurs between adjacent cells can be averaged. Consequently, an error in reproduction amplitude obtained when information pits recorded in accordance with the arrangement are reproduced can be reduced, and thus the quality of reproduction can be enhanced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-310068 filed on Oct. 25, 2005, which is hereby incorporated by reference herein in its entirety.

What is claimed is:

1. An optical information recording method comprising the steps of:

irradiating laser light onto cells provided on a track of an optical information recording medium;

recording on the optical information recording medium multilevel information including information of a level zero for which no information pit is formed, by changing, for each of the cells, widths in a track direction or sizes of information pits in the cells; and for recording the information of the level zero, irradiating the laser light at a power that is greater than an erasing power for erasing the information pits and that does not permit formation of the information pits.

2. The method of claim 1, wherein the power of the laser light when the information of the level zero is recorded is at most a recording power for recording the information pits.

3. The method of claim 1, wherein the multilevel information is recorded by changing an irradiation time of a recording power and an irradiation time of a cooling power for rapidly cooling the information pits.

4. The method of claim 3, wherein when the information of the level zero is recorded, the irradiation time of the recording power is longer than the irradiation time of the cooling power.

5. The method of claim 1, wherein cells on the track corresponding to each level of the multilevel information are affected by heat interference from the laser light.

6. An optical information recording/reproduction apparatus comprising:

a light source for irradiating laser light onto virtual cells provided at regular intervals on a track on an optical information recording medium;

an information recording circuit for recording on the optical information recording medium multilevel information including information of a level zero by changing widths in a track direction or sizes of information pits in the virtual cells; and an information reproduction circuit for reproducing the recorded multilevel information, wherein when the information of the level zero is recorded, said information recording circuit irradiates the laser light at a power that is greater than an erasing power for erasing the information pits and that does not permit formation of the information pits.

7. The apparatus of claim 6, wherein the power of the laser light when the information of level zero is recorded is at most a recording power for recording the information pits.

8. The apparatus of claim 6, wherein said information recording circuit records the multilevel information by changing an irradiation time of a cooling power for rapidly cooling the information pits.

9. The apparatus of claim 8, wherein when said information recording circuit records the information of the level zero, the irradiation time of the recording power is longer than the irradiation time of the cooling power.

10. The apparatus of claim 6, wherein virtual cells on the track corresponding to each level of the multilevel information are affected by heat interference from the laser light.

11. An optical information recording/reproduction apparatus comprising:

light source means for irradiating laser light onto virtual cells provided at regular intervals on a track on an optical information recording medium;

information recording means for recording on the optical information recording medium multilevel information including information of a level zero by changing widths in a track direction or sizes of information pits in the virtual cells; and information reproduction means for reproducing the recorded multilevel information, wherein when the information of the level zero is recorded, said information recording means irradiates the laser light at a power that is greater than an erasing power for erasing the information pits and that does not permit formation of the information pits.

12. The apparatus of claim 11, wherein the power of the laser light when the information of the level zero is recorded is at most a recording power for recording the information pits.

13. The apparatus of claim 1, wherein said information recording means records the multilevel information by changing an irradiation time of a recording power and an irradiation time of a cooling power for rapidly cooling the information pits.

14. The apparatus of claim 13, wherein when said information recording means records information of the level zero, the irradiation time of the recording power is longer than the irradiation time of the cooling power.

15. The apparatus of claim 10, wherein virtual cells on the track corresponding to each level of the multilevel information are affected by heat interference from the laser light.

* * * * *